United States Patent Office 3,400,616
Patented Sept. 10, 1968

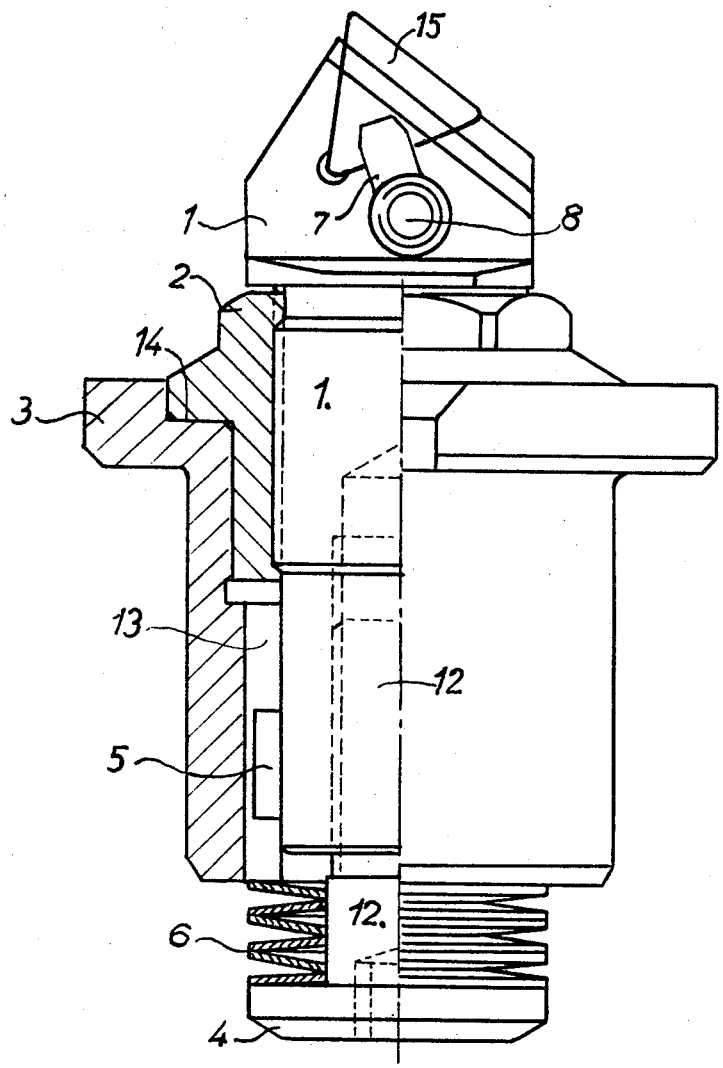

3,400,616
TOOL INSERT
Wlajko Mihic, Lotangsgatan 5, Gavle, Sweden
Filed July 20, 1966, Ser. No. 566,518
Claims priority, application Sweden, Aug. 26, 1965,
11,133/65
2 Claims. (Cl. 77—58)

ABSTRACT OF THE DISCLOSURE

There is disclosed a tool insert in which a tool head provided with a cutter is adjustable to desired positions by an adjusting nut mounted in an insert bushing, and in which the adjusting nut is threadedly connected to the head and biased to a seat disposed on the bushing by spring means, fastened between the bushing and a part connected to the head, the spring means comprising a plurality of elastic or spring washers abutting against each other, the part connected to the head comprising a screw threaded into the head and coaxial with the head, the screw having a threaded portion, a head portion and an intermediate portion, said nut and said bushing having cooperating surface means for preventing radial displacement of the nut relative to the bushing with minimum spring pressure, the screw head portion being in engagement with an end washer, and the intermediate portion having a shoulder stud portion defining means for maintaining alignment of the washers, the washers being disposed about the shoulder stud portion with washer holes in close-fit relation therewith, and the bushing terminating longitudinally adjacent the end washer disposed most remote from the screw head portion.

---

The present invention relates to a tool insert, in particular for boring bars, in which a tool head provided with a cutter of said tool collet is adjustable in desired positions by an adjusting nut mounted in an insert bushing and the adjusting nut is threadedly connected to the head and biased to a seat disposed on the bushing by a spring means fastened between the bushing and a part connected to the head.

The object of the invention is to provide a device, by which the tool will be maintained at all times automatically in the adjusted position in relation to the insert bushing and be easily adjustable within ample limits.

A further object of the invention is to provide a very simple and robust but low-priced tool insert.

The tool insert as defined by the invention is substantially characterized by the fact, that the spring means is composed by two or several elastic washers abutting against each other, and that the part connected to the head consists of a screw threaded into the head and coaxial with said head, the screw having its head engaged with the elastic washers.

The appended drawing shows an embodiment according to the invention.

The shown tool insert consists in a known fashion of a tool head 1, an adjusting nut 2, and an insert bushing 3. The adjusting nut 2 is rotatable in the bushing 3 for adjustment of the head 1 to arbitrary positions, to which head the nut 2 is threadedly engaged. The boring head 1 is prevented by a key 5 and a groove 13 receiving the latter in a portion of the bushing 3 presenting a reduced inner diameter from rotating relatively to the bushing.

The adjusting nut 2 threaded onto the head 1 is biassed against a seat 14 disposed on the bushing by a spring means 6, which is fastened between the bushing 3 and a part 4 connected to the head. The nut 2 is maintained in co-axial alignment with the bushing 3 by two diametrical portions of the nut 2 closely fitted within corresponding bore portions of the bushing 3, preventing any tendency for radial movement of the nut 2 relative to the bushing 3.

According to the present invention the spring means consists of two or several elastic washers 6 abutting against each other and the part connected to the head 1 consists of a screw 12 threaded into the head 1 and coaxial with said head, the screw having its head 4 resting against the elastic or spring washers 6.

By rotation of the screw 12, as will be easily understood, the tension of the elastic washers 6 may be controlled and hence the engagement force between the adjustment nut 2 and the seat 14 of the bushing.

The invention involves a handy possibility of accurate adjustment within ample limits of the head together with the cutting plate mounted thereon, denoted by 15, automatic and reliable engagement existing at all times between the adjustment nut 2 and the seat 14, implying an extremely accurate maintaining of the set position. In case of need the engagement force may be adjusted to a desired value swiftly and safely.

The great adjustment range depends upon the considerable length of the threaded portion of the parts 1, 2 and 12 engaging each other. In one of need the number of elastic washers 6 may be increased or reduced. It will be observed that the invention is not to be considered as limited to the shown and described embodiment, as other embodiments are possible within the scope of the invention.

What I claim is:
1. A tool insert, in particular for boring bars, in which a tool head provided with a cutter is adjustable to desired positions by an adjusting nut mounted in an insert bushing, and in which the adjusting nut is threadedly connected to the head and biased to a seat disposed on the bushing by a spring means, fastened between the bushing and a part connected to the head, characterized by the fact that the spring means comprises a plurality of elastic or spring washers abutting against each other, and that the part connected to the head comprises a screw threaded into the head and co-axial with said head, the screw having a threaded portion, a head portion, and an intermediate portion, wherein said nut and said bushing have cooperating surface means for preventing radial displacement of said nut relative to said bushing with minimum spring pressure, and further characterized in that the screw head portion is in engagement with an end washer, and said intermediate portion has a shoulder stud portion defining means for maintaining alignment of said washers, said washers being disposed about said shoulder stud portion with washer holes in close-fit relation therewith.
2. The tool insert of claim 1, wherein said bushing terminates longitudinally adjacent the end washer disposed most remote from said screw head portion.

References Cited
UNITED STATES PATENTS 3,116,653    1/1964    Lombardo _____ 77—58
3,178,969    4/1965    Yogus et al. _____ 77—58

GERALD A. DOST, *Primary Examiner.*